Dec. 4, 1945.   T. O. ADAMS, JR ET AL   2,390,068
ADJUSTABLE PITCH PROPELLER MECHANISM
Filed Dec. 11, 1942   3 Sheets-Sheet 3
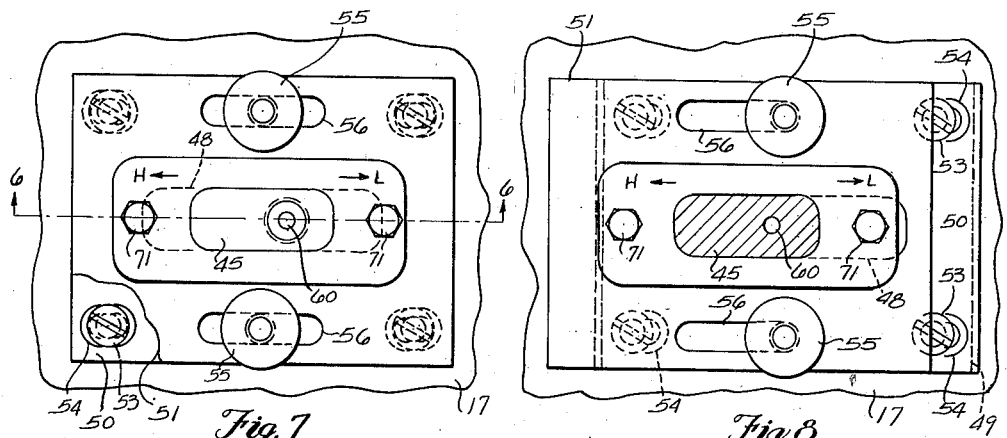
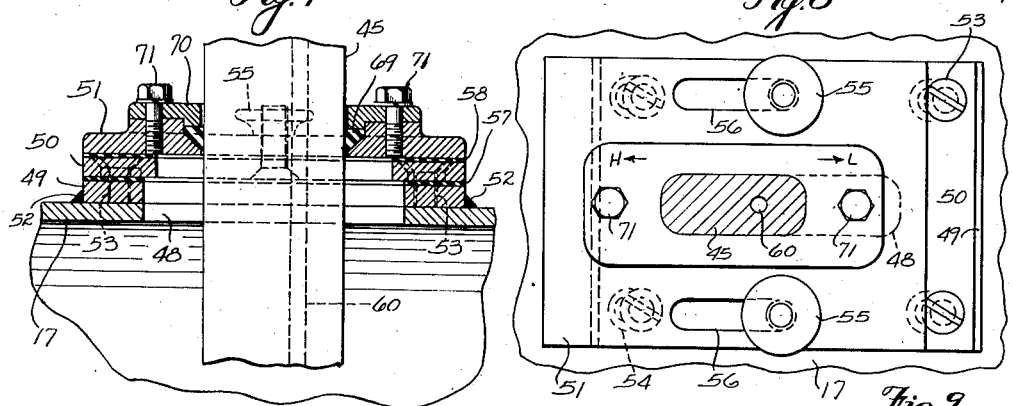
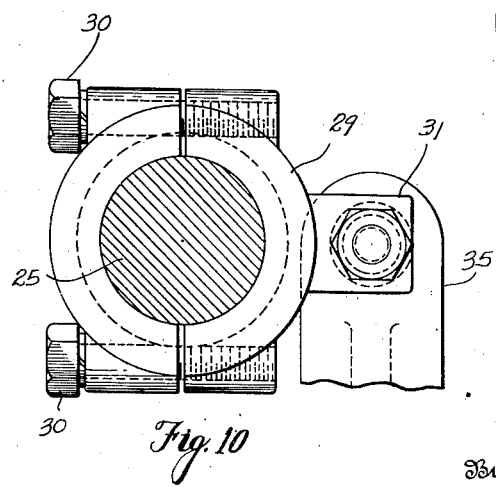
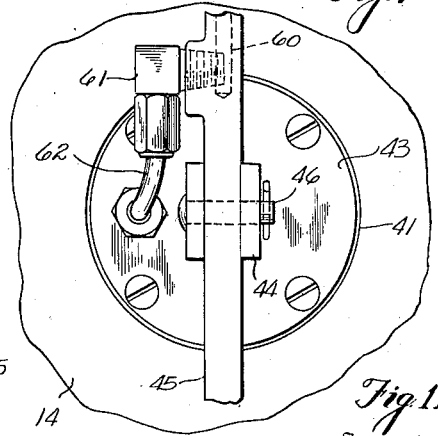
Inventors
Thomas O. Adams, Jr.
Theodor H. Troller
By Woodling and Krost
Attorneys Patented Dec. 4, 1945

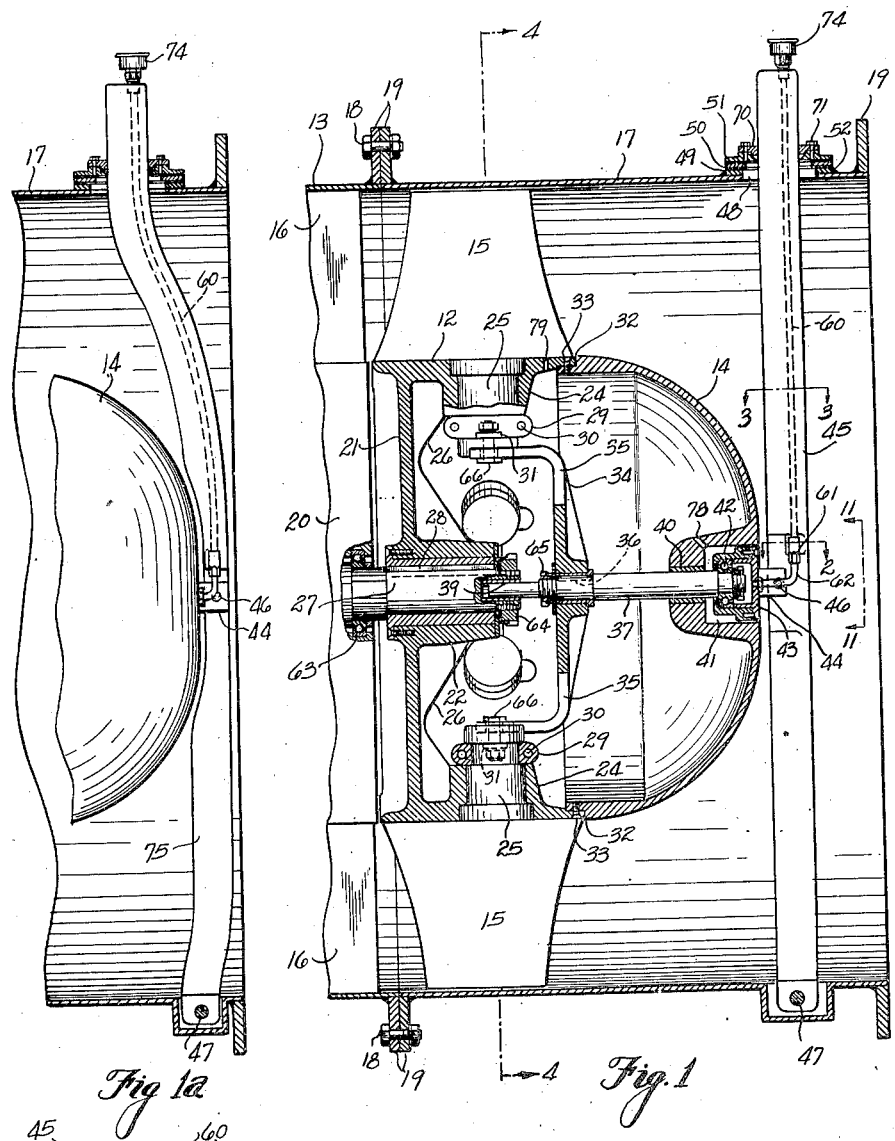

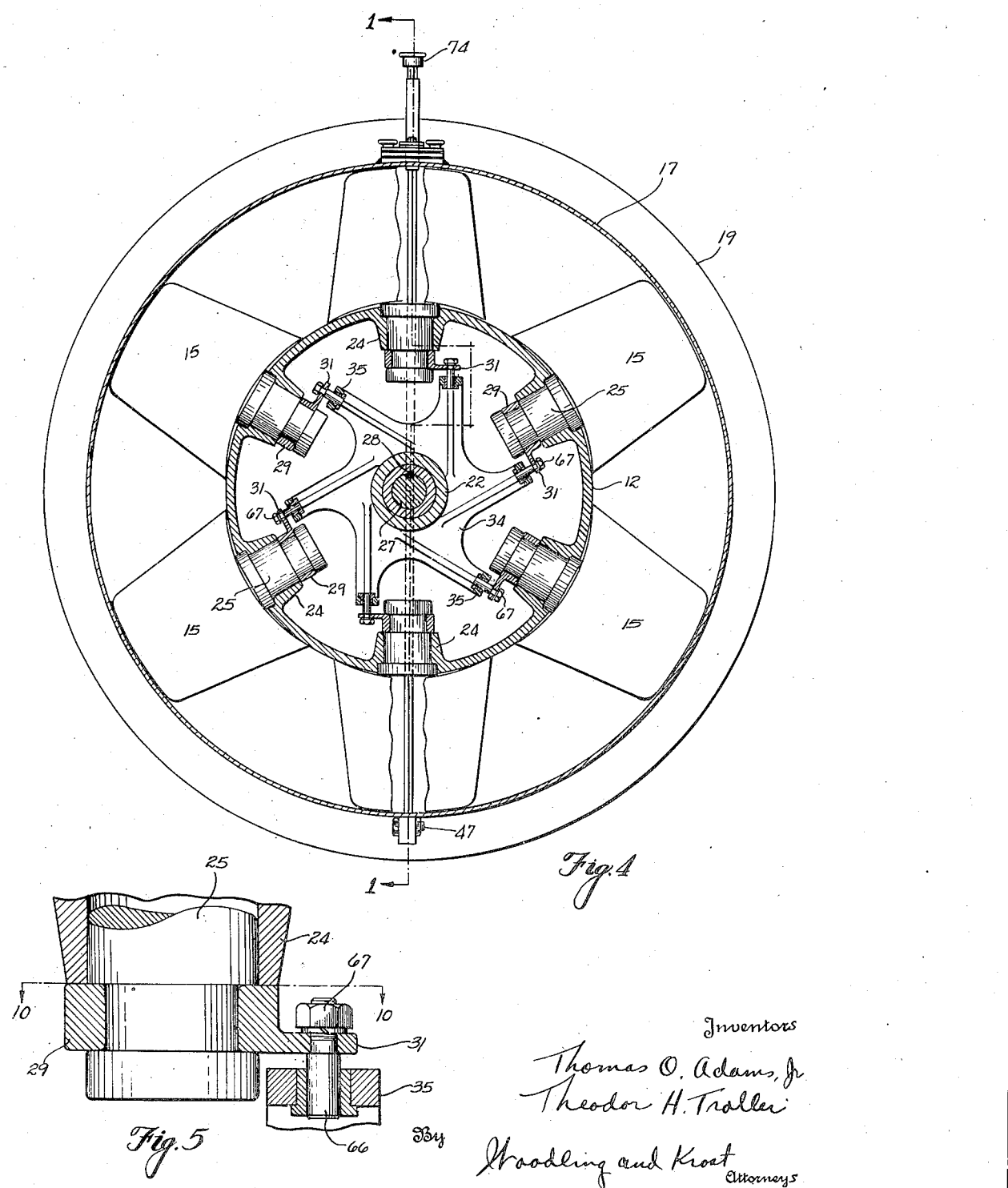

2,390,068

UNITED STATES PATENT OFFICE 2,390,068

ADJUSTABLE PITCH PROPELLER MECHANISM

Thomas O. Adams, Jr., and Theodor H. Troller, New Philadelphia, Ohio, assignors to La-Del Conveyor & Manufacturing Company, a corporation of Ohio Application December 11, 1942, Serial No. 468,678

16 Claims. (Cl. 230—114)

Our invention relates in general to variable pitch propeller fans and more particularly to a variable pitch propeller fan arranged to be mounted in an air flow duct and adapted to be controlled by a pitch adjusting mechanism having an actuating portion extending externally of the air flow duct.

An object of our invention is the provision of a fan blade pitch adjusting mechanism operable from the exterior of the air flow duct in which the fan rotates.

A further object of our invention is to provide a pitch adjusting mechanism for adjusting the pitch angle of the fan blades while the fan is operating.

Another object of our invention is to provide a pitch adjusting mechanism which is operable from the exterior of the air flow duct and which will not create any substantial disturbance in the air stream flowing through the duct.

Another object of our invention is the provision of a variable pitch propeller fan which makes very little noise when operating.

Another object of our invention is the provision of a variable pitch propeller fan wherein the fan blades are actuated at variable pitch angles by means of an axially movable spider controlled externally of the air flow duct.

Another object of our invention is the provision of a variable pitch fan carried by an overhanging driving shaft extension wherein the fan blades are actuated at variable pitch angles by an axilly movable spider which is carried by a control shaft having one end supported by a bearing in the end of the overhanging shaft extension and having the other end supported in a bearing carried by a nose-like cover secured to the rim into which the variable pitch fan blades are adjustably mounted.

Another object of our invention is the provision of a radially slidable pin connection between the spider and the crank arms which actuate the rotatably mounted shanks which carry the fan blade so that freedom of radial movement may exist between the spider and the crank arms to enable the spider to be centered substantially concentric about a line passing through the longitudinal axis of the overhanging shaft extension.

Another object of our invention is the provision of a variable pitch fan carried by an overhanging driving shaft extension wherein the fan blades are actuated at variable pitch angles by an axially movable spider which is carried by a control shaft having one end supported by the overhanging shaft extension and having the other end supported by a nose-like cover secured to the rim into which the variable pitch fan blades are adjustably mounted.

Another object of our invention is the provision of individually adjusting the pitch angle of the fan blades for a fixed axial position of the spider which controls the joint operation of all of the fan blades.

Another object of our invention is the provision of mounting the spider between the ends of the overhanging driving shaft extension and the forward portion of the nose-like cover and of providing rearwardly extending driving arms on the spider which terminate at a radial distance from the crank arms that actuate the shank of the fan blades to give freedom of radial movement between the spider driving arms and the crank arms that drive the shank.

Another object of our invention is the provision of an axially movable spider which controls the pitch of the fan blades and which does not interfere materially with the assembling or dismantling of the fan blades and associated parts since ample available space is provided between the spider and the shanks which support the blades in the rim driven by the overhanging driving shaft extension.

Another object of our invention is the provision of connecting the rim upon which the blades are carried to the hub that is mounted upon the overhanging driving shaft extension by means of a wall structure which has a relatively smooth surface upon the rearward side thereof.

Another object of our invention is the provision of a removable nose-like cover which gives access to the assembling and dismantling of the internally mounted parts of the fan construction.

Another object of our invention is the provision of conveying a lubricant to a bearing in the nose-like structure through the pitch adjusting mechanism that extends externally of the air flow duct.

Other objects and a fuller understanding of our invention may be had by referring to the following description and claims taken in conjunction with the accompanying drawings, in which:

Figure 1 is a fragmentary longitudinal cross-sectional view of one embodiment of our invention taken along the line 1—1 of Figure 4;

Figure 1a is a similar view of another embodiment having a slightly different form of transverse operating lever;

Figure 2 is a cross-sectional view of the operating lever taken along the line 2—2 of Figure 1;

Figure 3 is a cross-sectional view of the operating lever taken along the line 3—3 of Figure 1 and illustrates the streamlined cross-section of the operating lever;

Figure 4 is a transverse sectional view of our invention taken along the line 4—4 of Figure 1;

Figure 5 is an enlarged fragmentary sectional view showing the shank construction of the fan blades and the radially slidable pin connection between the driving arms of the spider and the crank arms which actuate the shank;

Figure 6 is an enlarged fragmentary view shown in cross-section and illustrates the adjusting arrangement for adjusting the position of the transversely disposed control lever; for a water-proof casing;

Figure 7 is a plan view of Figure 6;

Figure 8 is a view similar to Figure 7, but shows the adjusting lever at the high limit of pitch adjustment with the stop-limit plate shifted to the right for low ranges of pitch adjustment;

Figure 9 is a view similar to Figure 7 but shows the adjusting lever at the high limit of pitch adjustment with the stop-limit plate shifted to the left for high ranges of pitch adjusment;

Figure 10 is a fragmentary sectional view taken along the line 10—10 of Figure 5; and Figure 11 is an enlarged fragmentary and elevational view taken along the line 11—11 of Figure 1.

As illustrated in Figure 1, the variable pitch fan is arranged to rotate within an air flow duct which may comprise two sections 13 and 17 connected together in axial alignment by means of bolts 18 extending through the joining flanges 19. Our invention may be driven by any suitable means and as illustrated we show in Figure 1 the fan being driven by an electric motor having an outer casing 20 which is mounted substantially concentric within the section 13 by means of straightener vanes 16. The driving shaft of the motor is supported upon the right-hand end of the motor by a bearing 63 and our variable pitch propeller construction is arranged to be mounted upon the overhanging driving extension 27 of the motor shaft. That is to say, the overhanging driving extension of the motor shaft supports and drives our complete assembly which greatly facilitates the mounting of our variable pitch fan within the air flow duct section 17.

The propeller blades 15 are adjustably mounted in a rim 12 which is connected to a hub 22 by means of a wall structure 21 which has preferably a smooth outer surface adjacent to the end of the electric motor to prevent noises and other air disturbances. As illustrated, the wall structure 21 may be reinforced by ribs 26 to give a rigid construction. The hub 22 may be secured to the overhanging driving shaft extension 27 by means of a key 28 and a nut 64 threadably engaging the end of the shaft. The forward edge portion of the rim 12 is provided with a nose-like cover 14 which may be removably mounted thereon by means of the screws 33. The engagement between the forward edge of the rim 12 and the nose-like cover 14 may be rabbeted as at 32 to give a good joint connection. The wall structure 21, the rim 12 and the nose-like cover 14 provide an air enclosure or housing to prevent the air within the housing which is set into motion from entering into the general air stream passing through the air flow duct. Likewise, the housing prevents air laden with salt water spray, dust or other foreign or corrosive substances from freely contacting the internal working parts. The rim 12 is provided with a plurality of sockets 24 to receive the shanks 25 which carry the propeller blades 15. Preferably the shanks 25 are held in their sockets by means of clamping collars 29 which fit into an annular groove around the ends of the shanks which extend internally of the rim. As illustrated in Figure 10, the clamping collars 29 may be firmly clamped about the shank 25 by means of bolts 30. The clamping collars 29 are provided with crank arms 31 which substantially lie in a transverse plane passing through the axial center of the shanks 25. The ends of the crank arms 31 are actuated by a spider 34 which is carried by a control shaft 37 having its left-hand end thereof supported by a bearing 39 in the end of the overhanging driving extension shaft 27 and having its other end supported in a bearing 40 carried by the nose-like cover 14. The control shaft 37 is arranged to be reciprocally actuated within the bearings 39 and 40 by means of a control lever 45 which extends transversely of the air flow duct. The reciprocal movements of the spider 34 actuate the crank arms 31 for rotatively positioning the fan blades 15 at variable pitch angles. In the illustrated embodiment of our invention, the spider 34 is non-rotatively secured to the control shaft by means of a key 36 and a tightening nut 65. Consequently, as the control shaft is reciprocally actuated by the control lever 45, the spider 34 and the control shaft 37 turn as a unit in the bearings 39 and 40. As illustrated, the spider 34 is provided with a plurality of rearwardly extending driving arms 35 which terminate at radially spaced distances inwardly of the crank arms 31. As shown best in Figures 4 and 5, the driving arms 35 and the crank arms 31 are connected together by means of radially slidable pins 66 which fit in bushings in the driving arms 35. The pin 66 may be securely anchored to each crank arm 31 by means of the tightening nut 67. Therefore, freedom of radial movement may exist between the driving arms 35 and the crank arms 31 to enable the spider 34 to be centered substantially concentric about a line passing through the longitudinal axis of the overhanging driving extension shaft 27. That is to say, the bearings 39 and 40 center the spider without interference of the radially slidable pin connection 66 between the driving arms 35 of the spider and the crank arms 31 which actuate the propeller blades. The bushings into which the pins 66 fit may have an elongated opening or slot in order to accommodate the mis-alignment of the pins therein as the spider slightly turns upon the reciprocal movement thereof when actuating the crank arms. The propeller blades 15 may be each individually adjusted with respect to a fixed axial position of the spider 34 by loosening the bolts 30 and turning the blades to their correct position, after which the bolt 30 may again be tightened. The arrangement of the spider is such that ample room is made available for gaining access to the assembling and adjusting of the collars for the mounting and the setting of the propeller blades. This is accomplished in part by reason of the fact that the driving arms 35 as they extend rearwardly are disposed to one side of the shanks 25, see Figure 4. In our invention, we find that very fine adjustments may be made on the variable pitch angles since the spider is rigidly connected to the control shaft 37 and since the control shaft is well stabilized upon each end by the bearings 39 and 40. In other words, there is no lost motion or wobbling to the spider 34 which would give inaccurate setting for the variable pitch angles.

The right-hand end of the control shaft 37 extends through the nose-like cover 14 and terminates within a recess 41 provided in the forward portion of the nose-like cover. Mounted in the recess 41 is a ball-bearing 42 which, together with a clevis 44, connects the right-hand end of the control shaft 37 to an intermediate portion of the control lever 45. The ball bearing 42 is mounted in a bearing box 43 that fits relatively close within the recess 41. The forward or outer surface of the bearing box 43 is substantially flush with the contour of the joining surface of the nose-like cover 14. As shown in Figure 11, the clevis 44 may be connected to the intermediate portion of the control lever 45 by means of a pin 46. The lower end of the control lever 45 is connected by means of a pivot connection 47 to the air flow duct section 17. The upper end of the control lever extends through a slot 48 in the air flow duct section 17 and has a portion exposed for external actuation. The control lever 45 which extends diametrically across the air flow duct section 17 has a streamlined cross-section as shown in Figure 3 so as not to create any substantial disturbance in the air stream flowing through the duct. The adjusting arrangement for selectively setting the control lever 45 is shown in Figures 6 to 9, inclusive, and comprises generally three plates 49, 50 and 51 having openings therein through which the control lever passes. The lowermost plate 49 is fixedly mounted to the duct section 17, such for example as by welding at 52. The plate 50 may be characterized as a stop-limit plate and the plate 51 may be characterized as an adjusting plate which determines the position of the control lever between the limits of the stop-limit plate 50. The stop-limit plate 50 is arranged to be adjustably secured to the stationary plate 49 by means of screws 53 which extend through elongated slots 54. In Figure 7 the stop-limit plate 50 is shown substantially in an intermediate position. In Figure 8 the stop-limit plate 50 is moved to the right, and in Figure 9 the stop-limit plate 50 is moved to the left. Accordingly, the stop-limit plate 50 may be adjusted to any number of positions as provided by the screws 53 extending through the elongated slots 54. The adjusting plate 51 is shiftable with respect to the stop-limit plate 50 through means of thumb screws 55 which threadably engage studs extending through elongated slots 56 in the adjusting plate 51. Accordingly, by loosening the thumb screws 55 the control lever 45 may be adjusted to any number of positions between the limits defined by the stop-limit plate 50. In our invention, the adjusting arrangement for the control lever 45 is adapted to be fluid or water-tight. To accomplish this end, we use gaskets 57 and 58 between the joining surfaces of the plates. In addition, we employ a gasket seal 69 around the control lever 45. As illustrated, the gasket seal is compressed tightly against the control lever by means of a flange plate 70 held down against the adjustable plate 51 by means of cap screws 71.

In the normal adjustment of the pitch of the fan blades, the thumb screws 55 are first loosened and the handle 45 is moved together with the adjusting plate 51 either to the left toward the high limit of the pitch adjustment indicated by the letter H in Figure 7, or to the low limit of pitch adjustment indicated by the letter L. If a low range adjustment is desired, the adjusting plate 51 is removed and the stop-limit plate 50 is shifted to the right with respect to the plate 49 after which the adjusting plate 51 is remounted on the stop-limit plate 50 for normal operation. If a high range of adjustment is desired, the stop-limit plate 50 is shifted to the left as shown in Figure 9 as distinguished from Figure 8 which shows the stop-limit plate shifted to its low range of adjustment. Accordingly, under certain atmospheric or climatic conditions, the stop-limit plate 50 may be set at its low limit as shown in Figure 8 and the pitch of the blade varied by moving the lever 45 between its high and low limit determined by the lever 45 striking the ends of the slot in the stop-limit plate 50. Where the duct conditions require a greater pitch, the stop-limit plate 50 may be shifted to the left as shown in Figure 9 and then the lever 45 adjusted between its high and low limit determined by the lever 45 engaging the end of the slot in the stop-limit plate 50. In this manner, the range of adjustment of the pitch of the blade may be increased or decreased to meet the changing conditions.

Preferably the control lever 45 is provided with a lubrication duct 60 extending from the outer end of the lever to its central portion where it communicates with a grease fitting indicated generally at 61, see Figure 11, having a flexible connection 62 with the bearing box 43 for lubricating the bearing 42.

In Figure 1a, we show a modified form similar in all respects to the form shown in Figures 1 to 11, inclusive, except that the transverse operating lever 75 is curved rearwardly at its ends toward the nose-like cover so as to accommodate itself to a construction in which the space between the nose and the forward end of the air flow duct section 17 is restricted. In addition, the intermediate portion of the control lever 75 next adjacent to the forward portion of the nose-like cover 14 is substantially round instead of having a streamlined cross-section in order to further reduce the space taken up by the lever. The outer ends of the control lever 75 are substantially streamlined in their cross-section as indicated by the form shown in Figure 3. In other words, the control lever 75 has substantially a round intermediate cross-section and a substantially streamlined cross-section upon its two ends. The grease or lubricant which is to be supplied to the lubricant duct 60 may be contained in a grease cup 74 or be supplied by a grease gun having suitable fittings for conveying grease to the grease duct 60.

As shown in Figure 1, the recess 41 which contains the ball bearing 42 may be connected in communication with the internal construction of the nose-like cover 14 through an opening 78 so that in the event any moisture or other liquid should enter the recess 41, then it may be thrown out through the openings 78 into the internal construction of the nose-like cover 14. In addition, a hole 79 may be provided in the rim 12 in order to allow any moisture or other foreign matter to be expelled radially outwardly into the air flow duct. The opening 79 is not large enough to emit sufficient air to disturb the general flow of the stream of air in the duct, but is sufficiently large to allow moisture and other heavier particles to be discharged to the outside of the rotating housing defined by the wall structure 21, the rim 12, and the nose-like cover 14. There may be several openings like 79 located in any desired position through the housing and should the openings be located in the wall structure 21 care must be provided not to make them so large as to emit air between the rim and the motor as to disturb the general air flow in the duct.

We find that the control shaft 37 functions to conduct heat from the motor bearing 63 which must be safely guarded against overheating. In other words, the control shaft 37 provides a direct metal conducting path from the overhanging shaft extension 27 to the forward portion of the nose-like cover 14 which is maintained relatively cool by the incoming air. While the heat conduction is not large, yet it is sufficient to keep the motor bearing temperature down to safer operating limits.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, and means for reciprocally actuating the said control shaft and the spider for rotatively positioning the fan blades at variable pitch angles said outwardly extending portions of the spider terminating at radially spaced distances from the crank arms and permitting freedom of radial movement therebetween upon the said centering of the spider substantially concentric about a line passing through the longitudinal axis of the main shaft.

2. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, said control shaft extending outside of the nose-like cover and disposed for reciprocal actuation for reciprocally actuating the spider and for rotatively positioning the fan blades at variable pitch angles, said outwardly extending portions of the spider terminating at radially spaced distances from the crank arms and permitting freedom of radial movement therebetween upon the said centering of the spider substantially concentric about a line passing through the longitudinal axis of the main shaft.

3. In combination with an air flow duct having a main shaft supported by a bearing within the duct, said main shaft having a driving extension overhanging said bearing, the improvement of a variable pitch fan mounted within the air flow duct and carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, said control shaft extending outside of the nose-like cover and disposed for reciprocal actuation for reciprocally actuating the spider and for rotatively positioning the fan blades at variable pitch angles, an adjusting mechanism having a connection portion connected to the second end portion of the control shaft and having an actuating portion extending outside of the duct for reciprocally actuating the control shaft and the spider, and means mounted on the air flow duct for adjustably securing the actuating portion of the adjusting mechanism in a selected fixed position, said outwardly extending portions of the spider terminating at radially spaced distances from the crank arms and permitting freedom of radial movement therebetween upon the said centering of the spider substantially concentric about a line passing through the longitudinal axis of the main shaft.

4. In combination with an air flow duct having a main shaft supported by a bearing within the duct, said main shaft having a driving extension overhanging said bearing, the improvement of a variable pitch fan mounted within the air flow duct and carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, said control shaft extending outside of the nose-like cover and disposed for reciprocal actuation for reciprocally actuating the spider and for rotatively positioning the fan blades at variable pitch angles, an adjusting lever having an intermediate portion connected to the second end portion of the control shaft and extending transversely of the air flow duct in advance of the nose-like cover, one end of said lever being pivotally connected to one side of the air flow duct and the other end of said lever extending through the opposite side of the air flow duct for external actuation to control the reciprocal movements of the control shaft and the spider, and means mounted on the air flow duct for adjustably securing the said adjusting lever in a selected fixed position, said outwardly extending portions of the spider terminating at radially spaced distances from the crank arms and permitting freedom of radial movement therebetween upon the said centering of the spider substantially concentric about a line passing through the longitudinal axis of the main shaft.

5. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively by radially slidable pin means to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting and centering the spider substantially concentric about a line passing through the longitudinal axis of the main shaft, said spider being both longitudinally and rotatively movable with respect to said driving extension, whereby said spider has two degrees of freedom with reference to the main shaft, said outwardly extending portions of the spider terminating at radially spaced distances from the crank arms and permitting freedom of radial movement therebetween upon the said centering of the spider substantially concentric about a line passing through the longitudinal axis of the main shaft, and means for reciprocally actuating the said control shaft and the spider for rotatively positioning the fan blades at variable pitch angles.

6. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outward from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having connecting portions connected respectively by radially slidable pin means to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting and centering the spider substantially concentric about a line passing through the longitudinal axis of the main shaft, said spider being both longitudinally and rotatively movable with respect to said driving extension, whereby said spider has two degrees of freedom with reference to the main shaft, said spider having a central portion spaced forwardly of a plane passing transversely through the axes of the shanks with connecting arms extending rearwardly therefrom and terminating at radially spaced distances from the crank arms and permitting freedom of radial movement therebetween upon the said centering of the spider substantially concentric about a line passing through the longitudinal axis of the main shaft, and means for reciprocally actuating the said control shaft and the spider for rotatively positioning the fan blades at variable pitch angles.

7. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, and means for reciprocally actuating the said control shaft and the spider for rotatively positioning the fan blades at variable pitch angles, said crank arms being adjustably connected to the shank portions to enable individual setting of the fan blades with respect to a fixed position of the spider.

8. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means comprising substantially a solid wall member having a relatively smooth rearward surface connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, and means for reciprocally actuating the said control shaft and the spider for rotatively positioning the fan blades at variable pitch angles, said crank arms being adjustably connected to the shank portions to enable individual setting of the fan blades with respect to a fixed position of the spider.

9. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means mounted in the end of the main shaft for supporting the first end portion of the control shaft, second bearing means carried by the nose-like cover for supporting the second end portion of the control shaft, said bearing means and said control shaft supporting and centering the spider substantially concentric about a line passing through the longitudinal axis of the main shaft, said control shaft extending outside of the nose-like cover and disposed for reciprocal actuation for reciprocally actuating the spider and for rotatively positioning the fan blades at variable pitch angles, lever means disposed forwardly of the nose-like cover for reciprocally actuating the control shaft, third bearing means for connecting the control shaft to the lever means, said third bearing means being located in a recess in the forward end of the nose-like cover.

10. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, and means for reciprocally actuating the said control shaft and the spider for rotatively positioning the fan blades at variable pitch angles, said spider being non-rotatively secured to said control shaft whereby said control shaft is movable in said first and second bearing means as the reciprocal movements of the spider actuate the crank arms and whereby, said spider has two degrees of freedom with reference to the main shaft, said crank arms being adjustably connected to the shank portions to enable individual setting of the fan blades with respect to a fixed position of the spider.

11. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, a reciprocally movable control shaft having a first end portion and a second end portion with an intermediate portion therebetween for supporting the spider, first bearing means carried by the main shaft for supporting the first end portion of the control shaft, second bearing means carried by the nose-like cover for supporting the second end portion of the control shaft, said bearing means and said control shaft supporting the spider substantially concentric about a line passing through the longitudinal axis of the main shaft, said spider being both longitudinally and rotatively movable with respect to said driving extension, whereby said spider has two degrees of freedom with reference to the main shaft, and means for reciprocally actuating the said control shaft and the spider for rotatively positioning the fan blades at variable pitch angles, said nose-like cover and the second bearing means being removable as a unit from the forward edge portion of the rim to give access to the assembling and dismantling of the crank arms, the spider and the control shaft, the radial dimension of the rim being greater than the radial dimension of the spider.

12. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, outwardly extending connection means connecting the rim to the hub, said rim having a forward edge portion, a nose-like cover secured forwardly of the rim and substantially meeting the forward edge portion of the rim, fan blades rotatively mounted in the rim, each of said fan blades having a blade portion extending outwardly from the rim and having a shank portion extending inwardly of the rim, said shank portions being disposed in the rim on the side of the outwardly extending connection means which is opposite from the bearing, a plurality of crank arms disposed inwardly of the rim and connected respectively to said shank portions for rotatively positioning the fan blades at variable pitch angles, a spider arranged for reciprocal movement in a longitudinal direction axially of the main shaft and having outwardly extending portions connected respectively to the crank arms for rotating the blades incident to said reciprocal movement, means carried by the main shaft for supporting and centering the spider substantially concentric about a line passing through the longitudinal axis of the main shaft, said spider being both longitudinally and rotatively movable with respect to said driving extension, whereby said spider has two degrees of freedom with reference to the main shaft, and control means extending through the forward portion of the nose-like cover for reciprocally actuating the spider and for rotatively positioning the fan blades at variable pitch angles, said crank arms being adjustably connected to the shank portions to enable individual setting of the fan blades with respect to a fixed position of the spider.

13. Pitch adjusting mechanism for a propeller fan located within an air flow duct and having a plurality of radially projecting blades, including an axially movable adjusting member for positioning the blades at variable pitch angles, an adjusting lever extending transversely of the duct, means mounting said lever in said duct for movement axially thereof, means operably connecting said lever to said axially movable adjusting member to adjust the pitch of said blades, means on the duct limiting the axial movement of said lever, and means for adjustably securing said limiting means within predetermined limits.

14. Pitch adjusting mechanism for a propeller fan located within an air flow duct and having a plurality of radially projecting blades, including an axially movable adjusting member for positioning the blades at variable pitch angles, an adjusting lever extending transversely of the duct, means mounting said lever in said duct for movement axially thereof, means operably connecting said lever to said axially movable adjusting member to adjust the pitch of said blades, stop means for limiting movement of said lever, and means for adjustably securing said stop means to said duct whereby the range of movement of said lever can be varied.

15. In combination with a variable pitch fan mounted on a driving shaft and having adjustably mounted blades with crank arms to adjust the blades, the improvement of control means to adjust the blades comprising, in combination, motion transmitting means arranged for reciprocal movement in a longitudinal direction axially of the driving shaft and having surfaces to engage said crank arms for adjusting the blades incident to said reciprocal movement, a reciprocally movable control shaft, for reciprocally actuating the motion transmitting means, said motion transmitting means being mounted upon and movable with the control shaft, support bearing means carried by the driving shaft to support the control shaft and the motion transmitting means which is carried thereby substantially concentric about a line passing through the longitudinal axis of the driving shaft, said motion transmitting means which is carried by the control shaft being longitudinally and rotatively movable with respect to said bearing support means, whereby said motion transmitting means has two degrees of freedom with reference to the driving shaft.

16. In combination with a main shaft supported by a bearing, said main shaft having a driving extension overhanging said bearing, the improvement of a variable pitch fan carried by said overhanging driving extension of the main shaft and comprising, in combination, a hub mounted on said overhanging driving extension of the main shaft, a rim spaced radially from the hub, radially extending connection means connecting the rim to the hub, said rim having a forward edge portion, a nose-like cover secured forwardly of the rim and substantially meeting the forward edge portion of the rim, fan blades rotatively mounted on the rim, each of said fan blades having a blade portion extending radially outwardly from the rim and having a plurality of crank arms disposed radially inwardly of the rim and connected respectively to said shank portions for rotatively positioning the fan blades at variable pitch angles, motion transmitting means arranged for reciprocal movement in a longitudinal direction axially of the main shaft and having portions arranged to contact the crank arms rotating the blades incident to said reciprocal movement, supporting means carried by the main shaft for supporting and centering the motion transmitting means substantially concentric about a line passing through the longitudinal axis of the main shaft, and control means extending through the forward portion of the nose-like cover for reciprocally actuating the spider and for rotatively positioning the fan blades at variable pitch angles, said motion transmitting means being both longitudinally and rotatively movable with respect to said bearing support means, whereby said motion transmitting means has two degrees of freedom with reference to the driving shaft.

THOMAS O. ADAMS, Jr.
THEODOR H. TROLLER.